United States Patent [19]

Morris et al.

[11] Patent Number: 4,468,510
[45] Date of Patent: Aug. 28, 1984

[54] POLYESTERS OF TRANS-4,4'-STILBENEDICARBOXYLIC ACID, TEREPHTHALIC ACID OR 2,6-NAPHTHALENEDICARBOXYLIC ACID, 1,2-PROPANEDIOL AND 1,3-PROPANEDIOL

[75] Inventors: John C. Morris; Winston J. Jackson, Jr., both of Kingsport, Tenn.

[73] Assignee: Eastman Kodak Company, Rochester, N.Y.

[21] Appl. No.: 551,395

[22] Filed: Nov. 14, 1983

Related U.S. Application Data

[63] Continuation-in-part of Ser. No. 475,567, Mar. 15, 1983, Pat. No. 4,420,607.

[51] Int. Cl.³ .................. C08B 63/18; C08B 63/54
[52] U.S. Cl. .................... 528/298; 528/299; 528/302; 528/303; 528/301; 528/305; 528/306
[58] Field of Search .............. 528/298–299, 528/302–306, 191, 192, 194

[56] References Cited

U.S. PATENT DOCUMENTS 2,657,194 10/1953 Butler et al. ................... 528/306
3,190,764 10/1965 Cardina ......................... 427/407.1
3,247,043 4/1966 Cardina ......................... 427/400
3,496,839 2/1970 Hartle ........................... 528/306
3,842,040 10/1974 Browne et al. ................. 528/364
3,842,041 10/1974 Browne et al. ................. 528/176
4,414,382 11/1983 Morris et al. ................... 528/298
4,420,607 12/1983 Morris et al. ................... 528/298

Primary Examiner—Lester L. Lee
Attorney, Agent, or Firm—William P. Heath, Jr.; Daniel B. Reece, III

[57] ABSTRACT

This invention relates to polyesters of high molecular weight useful as films, fibers and molding plastics. It is particularly concerned with copolyesters comprising repeating units from trans-4,4'-stilbenedicarboxylic acid, optionally 0–40 mol % of terephthalic acid or 2,6-naphthalenedicarboxylic acid, and 1,2-propanediol, the polyesters having an inherent viscosity of about 0.3 or more and a flexural modulus of at least 900,000 psi.

This invention is also concerned with copolyesters comprising repeating units of trans-4,4'-stilbenedicarboxylic acid, at least 10 mol % of one or more components selected from the group consisting of an aromatic dicarboxylic acid, aliphatic dicarboxylic acid or aliphatic glycol, and 1,3-propanediol. The polyesters have unobviously low gas permeability properties.

6 Claims, No Drawings

POLYESTERS OF TRANS-4,4'-STILBENEDICARBOXYLIC ACID, TEREPHTHALIC ACID OR 2,6-NAPHTHALENEDICARBOXYLIC ACID, 1,2-PROPANEDIOL AND 1,3-PROPANEDIOL

This application is a continuation-in-part of U.S. Pat. application Ser. No. 475,567 filed March 15, 1983, now U.S. Pat. No. 4,420,607.

DESCRIPTION

1. Technical Field

This invention relates to polyesters of high molecular weight useful as films, fibers and molding plastics. It is particularly concerned with copolyesters comprising repeating units from trans-4,4'-stilbenedicarboxylic acid, optionally 0–40 mol % of terephthalic acid or 2,6-naphthalenedicarboxylic acid, and 1,2-propanediol, the polyesters having an inherent viscosity of about 0.3 or more and a flexural modulus of about 900,000 psi or more.

This invention provides molding plastics with superior strength and stiffness compared to those of conventional polyesters prepared from symmetrical aromatic acids and aliphatic glycols. Fibers and films with high tensile strength and exceptionally high modulus may be made from polyesters of this invention.

This invention further relates to copolyesters which, while exhibiting ordinary molding plastic moduli and tensile strengths, exhibit unobviously low gas transmission rates, especially oxygen, carbon dioxide and water vapor. These copolyesters contain repeating units from trans-4,4'-stilbenedicarboxylic acid, 1,3-propanediol and repeating units in the amount of at least 10 mol % of one or more compounds selected from another aromatic dicarboyxlic acid containing 8 to 20 carbon atoms, aliphatic dicarboxylic acids containing 3 to 10 carbon atoms and another aliphatic glycol containing 2 to 10 carbon atoms.

Films and bottles containing the repeating units from 1,3-propanediol provide unusually low gas transmission properties.

2. Prior Art

Japanese Kokai No. 72348/74 discloses the polymer of 100 mol % trans-4,4'-stilbenedicarboxylic acid and 1,6-hexanediol blended with poly(1,4-butylene terephthalate). There is no teaching in this prior art that shaped objects having unusually high strength and stiffness are obtainable.

U.S. Pat. No. 2,657,195 discloses polyesters, polyamides and polyesteramides prepared from various isomeric stilbenedicarboxylic acids and glycols containing from 2 to 16 carbons. Example 1 and Example 5 are homopolyesters of ethylene glycol and 1,5-pentanediol. The remaining examples deal with polyesters prepared from terephthalic acid and stilbenedicarboxylic acid and ethylene glycol. Polyesters of 1,2-propanediol and 1,3-propanediol are not specifically disclosed in the patent.

U.S. Pat. No. 3,496,839 discloses low molecular weight homopolyesters of 4,4'-stilbenedicarboxylic acid and glycols containing 2 to 20 carbon atoms. In Column 2, lines 25 and 41 specifically mention 1,2-propanediol (propylene glycol) and 1,3-propanediol in a general listing of useful glycols for the invention. However, all the examples concern low molecular weight polyesters of 4,4'-stilbenedicarboxylic acid, neopentyl glycol, and terephthalic acid. It is also important to note that none of the isomers of stilbenedicarboxylic acid are distinguished from one another.

Stilbenedicarboxylic acid polyesters containing sulfonate groups are disclosed in U.S. Pat. No. 4,073,777. Example 6 illustrates a low molecular weight polyester containing 10 wt. % 4,4'-stilbenedicarboxylic acid which is useful for radiation crosslinkable water dispersible coatings. Also, in a general listing of glycols useful for the invention (Column 3, line 27), propylene glycol is mentioned but no examples are given.

In U.S. Pat. No. 3,190,764, Column 3, line 27 and in U.S. Pat. No. 3,247,043, Column 3, line 29, polyesters of stilbenedicarboxylic acid and 1,2-propanediol are disclosed, but no examples are given. No 1,3-propanediol polymers are disclosed.

Other U.S. patents which disclose stilbenedicarboxylic acid polyesters are U.S. Pat. No. 2,657,194, U.S. Pat. No. 3,842,040, and U.S. Pat. No. 3,842,041. No 1,2-propanediol or 1,3-propanediol polymer examples are given. Polyesters of trans-4,4'-stil-benedicarboxylic acid and neopentyl glycol, 1,5-pentanediol, 1,6-hexanediol, and 1,10-decanediol are disclosed by Meurisse et al in the *British Polymer Journal*, Vol. 13, 1981, page 57 (Table 1).

3. Practice of the Invention

The prior art discloses molding, spinning, and extruding into film as viable processes for shaping the polymers based on stilbenedicarboxylic acid. We have discovered a range of polymer compositions based on 1,2-propanediol and the trans-4,4'-stilbenedicarboxylic acid (SDA) isomer within this broad disclosure which exhibit exceptionally high strength and stiffness when molded, extruded, or spun. Injection molded polymers containing repeating units from about 60 to 100 mol % trans-4,4'-stilbenedicarboxylic acid, 0 to 40 mol % repeating units from terephthalic acid or 2,6-naphthalenedicarboxylic acid, and 100 mol % repeating units from 1,2-propanediol exhibit a flexural modulus of about $9.0 \times 10^5$ psi or more and a tensile strength $> 18.0 \times 10^3$ psi.

Polyesters of this invention are prepared from trans-4,4'-stilbenedicarboxylic acid and or its esters, terephthalic acid and 2,6-naphthalenedicarboxylic acid or their esters, and 1,2-propanediol. Examples of useful acid esters are the dimethyl, diethyl, dipropyl, dibutyl, diphenyl, or any combination of these mixed esters.

The terephthalic acid or 2,6-naphthalenedicarboxylic acid portion of the polymer may vary from 0 to about 40 mol %, preferably 5 to 40 mol %, such that the total dicarboxylic acid content of the polymers is 100 mol %. The terephthalic acid or 2,6-naphthalenedicarboxylic acid portion of the polymer may be replaced with up to 10 mol % of isophthalic acid. The terephthalic acid portion may also be replaced with a substituted terephthalic acid such as 2-chloro, 2-methyl, 2-ethyl, 2-propyl, 2,5-dichloro-, or 2,5-dimethyl terephthalic acid. Terephthalic acid or 2,6-naphthalenedicarboxylic acid is preferred.

The trans-4,4'-stilbenedicarboxylic acid content of the polymer may vary from 100 to 60 mol %, preferably 95 to 60 mol %, such that the sum of the total dicarboxylic acid content of the polymer is 100 mol %. The inherent viscosities of the polymers are at least 0.3 and preferably at least 0.4. The polymers are prepared in the melt or by solid-phase polymerization of ground polymer or a combination of these processes.

The trans-4,4'-stilbenedicarboxylic acid/1,3-propanediol copolyesters of this invention exhibit ordinary molding plastic moduli and tensile strengths (Table 1 in U.S. application patent Ser. No. 475,567) but have unobviously low gas transmission rates, especially to oxygen, carbon dioxide and water, compared with poly(ethylene terephthalate) (Table 1). The 1,3-propanediol copolyester compositions of this invention are prepared from trans-4,4'-stilbenedicarboxylic acid (SDA) or its esters, and at least 10 mol % of one or more components selected from the group consisting of aromatic dicarboxylic acids or their esters, aliphatic dicarboxylic acids or their esters, and aliphatic glycols.

The aromatic dicarboxylic acid modifier content of the polymers may vary from 0 to 50 mol %, preferably 0 to 40 mol %, such that the sum of the SDA content and the aromatic dicarboxylic acid modifier content is equal to 100 mol %. Hence, the SDA content of the polymer may vary from 50 to 100 mol %, preferably from 60 to 100 mol %, such that the sum of the aromatic dicarboxylic acid modifier portion and the SDA portion of the copolyester is equal to 100 mol %. Examples of useful acid esters are dimethyl, diethyl, dipropyl, dibutyl, diphenyl or any combination of these as mixed esters.

The aliphatic acid portion of the 1,3-propanediol copolyesters may consist of dicarboxylic acids containing 3 to 10 carbon atoms. The aliphatic dicarboxylic acid content of the polymers may vary from 0 to 40 mol %, preferably 0 to 30 mol %, such that the sum of the aromatic dicarboxylic acids and the aliphatic dicarboxylic acids is equal to 100 mol %. Examples of suitable aliphatic dicarboxylic acids are diglycolic, malonic, succinnic, glutaric, adipic, pimelic, suberic, azelaic, and sebacic acid or a combination of these dicarboxylic acids.

The aliphatic glycol modifier of the 1,3-propanediol copolyesters consists of glycols with 2 to 10 carbon atoms. The aliphatic glycol modifer content of the copolyesters may vary from 0 to 40 mol %, preferably 0 to 30 mol %, such that the sum of the 1,3-propanediol content and the aliphatic glycol modifier content is equal to 100 mol %. Examples of useful glycols are ethylene glycol, 1,2-propanediol, neopentyl glycol, 1,4-butanediol, 1,5-pentanediol, 1,3- or 1,4-cyclohexanedimethanol, 1,3-bis(hydroxyethoxy)benzene, 1,3-bis(hydroxyethoxy)-5-chlorobenzene, 1,4-bis(hydroxyethoxy)benzene, 1,4-bis(hydroxyethoxy)-2-chlorobenzene, 1,4-bis(hydroxy-ethoxy)-2,5-dichlorobenzene, and 1,4-bis(hydroxy-ethoxy)-2,3-dichlorobenzene. Finally a combination of aliphatic glycol(s), aliphatic acid and aromatic acid modifier(s) as previously disclosed may be used as long as the SDA content is equal to or greater than 60 mol %, preferably at least 70 mol %, and the 1,3-propanediol content is at least 60 mol % and preferably at least 70 mol %.

The following examples illustrate the unobviously high strength and stiffness (Examples 1–11) and low gas permeabilities (Examples 12–14) of these copolymers.

This invention can be further illustrated by the following examples of preferred embodiments thereof, although it will be understood that these examples are included merely for purposes of illustration and are not intended to limit the scope of the invention unless otherwise specifically indicated.

EXAMPLES

All inherent viscosities are determined at 25° C. in 60/40 (wt./wt.) phenol/tetrachloroethane (PTCE) at a concentration of 0.5 g./100 mL.

The polyesters are dried at 80 to 100° C. for 24 hours in a vacuum oven and injection molded on a one-ounce Watson-Stillman molding machine to give $2\frac{1}{2} \times \frac{3}{8} \times 1/16$ inch tensile bars and $5 \times \frac{1}{2} \times \frac{1}{8}$ inch flexure bars. ASTM procedures are used for measuring the tensile strength (ASTM D-1708) and flexural modulus (ASTM D-790).

Fibers are spun on an Instron Melt Rheometer Model 3211 through a capillary (0.014 inch in diameter) equipped with a capillary heater. The design of the capillary allows use of a filtering system such as a wire screen and sand or stainless steel powder. Tensile properties of the fibers are determined using a standard one-inch gauge length for single filaments. Fibers are glued to a paper substrate prior to tensile testing to reduce damage to the single filaments from the clamps.

1.

The following example illustrates the preparation of a polymer containing 100 mol % trans-4,4'-stilbenedicarboxylic acid and 100 mol % 1,2-propanediol.

A mixture of 236.8 g. (0.8 mol) dimethyl trans-4,4'-stilbenedicarboxlyate, 182.4 g. 1,2-propanediol (2.4 mol), 0.15 g. titanium tetraisopropoxide (100 ppm Ti) and 0.10 g. zinc acetate (125 ppm Zn) is placed in a one-litre flask equipped with an inlet for nitrogen, a metal stirrer, and a short distillation column. The flask is heated at 190° C. for 10 hours, 210° C. for 1 hour, 240° C. for $\frac{3}{4}$ hour, then a vacuum is applied gradually as the temperature is raised to 260° C. Full vacuum of 0.5 mm. is maintained for 30 minutes. The light yellow, opaque polymer has an I.V. of 0.38.

The polymer is ground to pass a 3 mm. screen and is solid-phase polymerized by heating from room temperature to 210°–215° C. over 1 hour and then by heating for 6 hours at 210°–215° C. The polymer has an I.V. of 0.68.

The solid-phased polymer is molded at 280° C. to give molded bars with a flexural modulus of $16.7 \times 10^5$ psi and a tensile strength of $28.8 \times 10^3$ psi.

2.

The polymer containing 95 mol % trans-4,4'-stilbenedicarboxylic acid, 5 mol % terephthalic acid, and 100 mol % 1,2-propanediol is prepared according to the procedure of Example 1 to an I.V. of 0.41.

The polymer is ground to pass a 3 mm. screen, dried, and solid-phase polymerized by heating the polymer at 215° C. for 5 hours to an I.V. of 0.67.

The polymer is dried and molded to give molded bars with a flexural modulus of $15.0 \times 10^5$ psi and a tensile strength of $28.0 \times 10^3$ psi.

The following example illustrates the unobviously high tenacity and modulus of the copolyester fibers.

3.

The polymer containing 95 mol % trans-4,4'-stilbenedicarboxylic acid, 5 mol % terephthalic acid, and 100 mol % 1,2-propanediol is prepared according to the procedure of Example 1 to an I.V. of 0.79.

The polymer is spun on the Instron Melt Rheometer equipped with a capillary (length to diameter ratio of 50) and a filter consisting of 0.4 g. 40/60 mesh sand supported by two 60 mesh screens. The barrel temperature is 240° C. and the capillary is 320° C. As-spun fiber taken at 800 ft./min. is 6.3 denier/filament and has 6.3 g./den tenacity and 282 g./den modulus.

4.

The polymer containing 80 mol % trans-4,4'-stilbenedicarboxylic acid, 20 mol % 2,6-naphthalenedicarboxylic acid, and 100 mol % 1,2-propanediol is prepared according to the procedure of Example 1 to an I.V. of 0.54.

The polymer is dried and molded at 250° C. as described in the previous examples. Molded bars have a flexural modulus of $14.2 \times 10^5$ psi.

5.

The following example illustrates the preparation of a polymer containing 60 mol % trans-4,4'-stilbenedicarboxylic acid, 40 mol % terephthalic acid, and 100 mol % 1,2-propanediol.

A mixture of 159.8 g. (0.54 mol) dimethyl trans-4,4'-stilbenedicarboxylate, 69.8 g. (0.36 mol) dimethyl terephthalate, 205.2 g. (2.7 mols) 1,2-propanediol, 0.14 g. titanium tetraisopropoxide (100 ppm Ti), and 0.084 g. zinc acetate (125 ppm Zn) is placed in a one-litre flask equipped with an inlet for nitrogen, a metal stirrer, and a short distillation column. The flask is heated by a Woods' metal bath at 185°–190° C. for 7 hours, 210° C. for 1 hour, 240° C. for ½ hour and then a vacuum is applied gradually as the temperature is raised to 260° C. Full vacuum of 0.5 mm. is maintained for 1½ hours. The clear, orange, high melt viscosity polymer turns opaque on cooling and has an I.V. of 0.46.

The polymer is ground to pass a 3 mm. screen, dried at 80° C. in a vacuum oven and molded at 260° C. to give molded bars with $8.9 \times 10^5$ psi flexural modulus and $18.9 \times 10^3$ psi tensile strength.

The remaining 1,2-propanediol polymers in Table 1 and the following comparative examples containing 1,3-propanediol, 2,2-dimethyl-1,3-propanediol, 1,5-pentanediol, 1,6-hexanediol, and 1,4-cyclohexanedimethanol are prepared using procedures similar to those of Examples 1-5.

6.

U.S. Pat. No. 3,496,839 discloses polymers of 4,4'-stilbenedicarboxylic acid and 1,3-propanediol (Column 2, line 29). For comparison with the polymer of our invention, we prepared a polymer of 90 mol % trans-4,4'-stilbenedicarboxylic acid, 10 mol % terephthalic acid, and 100 mol % 1,3-propanediol using a procedure similar to Example 1 to an I.V. of 0.81.

The polymer is dried, ground and molded at 290° C. Molded bars have $2.6 \times 10^5$ psi flexural modulus and $6.0 \times 10^3$ psi tensile strength.

7.

The polymer of 80 mol % trans-4,4'-stilbenedicarboxylic acid, 20 mol % terephthalic acid, and 100 mol % 1,3-propanediol is prepared as in Example 1 to an I.V. of 0.91.

The polymer is dried, ground, and molded at 280° C. Molded bars have $2.5 \times 10^5$ psi flexural modulus and $12.1 \times 10^3$ psi tensile strength.

8.

U.S. Pat. Ser. No. 3,496,839 gives examples of the preparation of polyesters of trans-4,4'-stilbenedicarboxylic, terephthalic acid, and neopentyl glycol. For comparison of our polymers with those in U.S. Pat. No. 3,496,839, we prepared a polymer containing 60 mol % trans-4,4'-stilbenedicarboxylic acid, 40 mol % terephthalic acid, and 100 mol % neopentyl glycol.

A mixture of 142.1 g. (0.48 mol) dimethyl trans-4,4'-stilbenedicarboxylate, 62.1 g. (0.32 mol) dimethyl terephthalate, 166.4 g. (1.6 mols) neopentyl glycol, and 0.15 g. titanium tetraisopropoxide (100 ppm Ti) is placed in a one-litre flask equipped as in Example 1. The flask is heated at 200° C. for 1 hour, at 240° C. for ½ hour and at 260° C. for ½ hour. A vacuum of 0.5 mm. is applied gradually and the temperature is raised to 280° C. After about 35 to 40 minutes at 280° C., a clear, yellow, high melt viscosity polymer is obtained with an I.V. of 0.89.

The polymer is ground, dried, and molded as described in Example 1. The molded bars have a flexural modulus of $3.1 \times 10^5$ psi and a tensile strength of $7.4 \times 10^3$ psi.

9.

The polymer of 100 mol % trans-4,4'-stilbenedicarboxylic acid and 100 mol % 1,5-pentanediol as disclosed in Example 5 of U.S. Pat. No. 2,657,195 is prepared using a procedure similar to our Example 1. A clear, light yellow polymer turns opaque on cooling and has an I.V. of 1.1.

The polymer is ground and molded at 290° C. Molded bars have a flexural modulus of $2.5 \times 10^5$ psi and a tensile strength of $12.2 \times 10^3$ psi.

10.

The polymer of 100 mol % trans-4,4'-stilbenedicarboxylic acid and 100 mol % 1,6-hexanediol disclosed in Japanese Kokai No. 72348/74 as a polymer blend with poly(1,4-butylene terephthalate) is prepared as in Example 1. The opaque fibrous polymer has an I.V. of 0.98.

The polymer is ground and molded at 260° C. Molded bars have $8.8 \times 10^5$ psi flexural modulus and $18.0 \times 10^5$ psi tensile strength.

11.

U.S. Pat. No. 3,496,839 discloses polymers of trans-4,4'-stilbenedicarboxylic acid and 1,4-cyclohexanedimethanol (Column 2, line 29). For comparison with the polymers of our invention, we prepared a polymer containing 60 mol % trans-4,4'-stilbenedicarboxylic acid, 40 mol % terephthalic acid, and 100 mol % 1,4-cyclohexanedimethanol.

A mixture of 133.2 g. (0.45 mol) dimethyl trans-4,4'-stilbenedicarboxylate, 58.2 g. (0.30 mol) dimethyl terephthalate, 185.1 g. (0.90 mol) 1,4-cyclohexanedimethanol (70% trans), and 0.15 g. titanium tetraisopropoxide (100 ppm Ti) is placed in a one-litre flask equipped as in Example 1. The flask is heated at 200° C. and the temperature is raised immediately to 300° to 310° C. over the next hour. After ~30 minutes at 300° to 310° C. a vacuum of 0.5 mm. is gradually applied. The vacuum is maintained for 15 minutes. A slightly hazy, high melt viscosity, light yellow polymer is obtained with an I.V. of 0.82.

The polymer is ground, dried, and then molded at 290° C. as described in Example 1. The molded bars have a flexural modulus of $2.8 \times 10^5$ psi and a tensile strength of $10.4 \times 10^3$ psi.

TABLE 1

COMPARISON OF TRANS-4,4'-STILBENEDICARBOXYLIC ACID/-TEREPHTHALIC ACID/GLYCOL COPOLYESTER MOLDING PLASTIC PROPERTIES

| Glycol | SDA, Mol %[a] | TPA, Mol %[a] | I.V.[b] | Flexural Modulus, $10^5$ psi | Tensile Strength $10^3$ psi | Example No. |
|---|---|---|---|---|---|---|
| 1,2-propanediol | 100 | 0 | 0.68 | 16.7 | 28.8 | 1 |
| | 95 | 5 | 0.67 | 15.0 | 28.0 | 2 |
| | 80 | 20[c] | 0.54 | 14.2 | — | 4 |
| | 70 | 30 | 0.45 | 12.3 | 26.1 | — |
| | 60 | 40 | 0.46 | 8.9 | 18.9 | 5 |
| | 50 | 50 | 0.43 | 3.0 | 10.7 | — |
| 1,3-propanediol | 90 | 10 | 0.81 | 2.6 | 6.0 | 6 |
| | 80 | 20 | 0.91 | 2.5 | 12.1 | 7 |
| 2,2-dimethyl-1,3-propanediol | 100 | 0 | 0.74 | 3.0 | 10.7 | — |
| | 80 | 20 | 0.80 | 3.0 | 7.2 | — |
| | 60 | 40 | 0.89 | 3.1 | 7.4 | 8 |
| | 50 | 50 | 0.70 | 2.6 | 8.0 | — |
| 1,5-pentanediol | 100 | 0 | 1.10 | 2.5 | 12.2 | 9 |
| 1,6-hexanediol | 100 | 0 | 0.98 | 8.8 | 18.0 | 10 |
| 1,4-cyclohexane-dimethanol | 100 | 0 | | ** | | — |
| (70% trans) | 95 | 5 | | ** | | — |
| | 70 | 30 | 0.76 | 3.0 | 10.9 | — |
| | 60 | 40 | 0.82 | 2.8 | 10.4 | 11 |
| | 50 | 50 | 0.79 | 2.5 | 10.0 | — |

[a] SDA is trans-4,4'-stilbenedicarboxylic acid; TPA is terephthalic acid.
[b] I.V. is inherent viscosity.
[c] The terephthalic acid portion of this polymer has been replaced with 20 mol % 2,6-naphthalenedicarboxylic acid.
** Too high melting to mold.

The following examples illustrate the preparation and the unobviously low gas permeabilities of SDA/1,3-propanediol copolyesters.

The copolyesters are prepared in the melt and/or by solid-phase polymerization, ground to pass a 3-mm screen, and dried at 100° C. overnight in a vacuum oven. The copolyesters are extruded in the range of 250° to 310° C. onto a hot roll heated at 80° to 100° C. or a temperature at or above the polymer Tg and then wound up to give film 5 to 20 mils in thickness.

The oxygen permeability of the films is determined at 30° C. using a MoCon Oxtran 10/50 permeability tester. The carbon dioxide permeability and the water vapor transmission rate of selected films are also determined. The carbon dioxide permeability is determined using a Permatran C IV permeability tester and the water vapor transmission rate is determined using a Permatran W permeability tester.

12.

Commercial poly(ethylene terephthalate) (I.V.=0.72) is extruded at 280° C. onto an 80° C. hot roll to give 20-mil film. The film has an oxygen permeability of 9.9 cc-mil/100 in$^2$- 24 hr-atm and a water vapor transmission rate of 3.7 g-mil/100 in$^2$-24 hr-atm.

13.

The following example illustrates the preparation of the copolyester containing repeating units from 80 mol % trans-4,4'-stilbenedicarboxylic acid, 20 mol % terephthalic acid and 100 mol % 1,3-propanediol.

A mixture of 189.4 g (0.64 mol) dimethyl trans-4,4'-stilbenedicarboxylate, 31.0 g (0.16 mol) dimethyl terephthalate, 121.6 g (1.6 moles) 1,3-propanediol, 0.042 g zinc acetate (65 ppm Zn) and 0.034 g titanium tetraisopropoxide (25 ppm Ti) are placed in a one-liter flask equipped with an inlet for argon, a metal stirrer and a short distillation column. The contents of the flask are heated under argon in a Wood's metal bath at 190° C. for 4 hours, at 220° C. for 1 hour and at 280° C. for ½ hour. A vacuum of 0.5-mm is gradually applied over the next 10 minutes and full vacuum is maintained for about 40 minutes. A high melt viscosity, light yellow crystalline polymer is obtained with an I.V. of 0.98.

The polymer is extruded into 10-mil film at 290° C., and the film has an oxygen permeability of 2.2 cc-mil/100 in$^2$-24 hr-atm, a carbon dioxide permeability of 9.0 cc-mil/100 in$^2$-24 hr-atm, and a water vapor transmission rate of 1.0 g-mil/100 in$^2$-24 hr-atm.

14.

The copolyester of 70 mol % trans-4,4'-stilbenedicarboxylic acid, 30 mol % terephthalic acid, and 100 mol % 1,3-propanediol is prepared as in Example 2 to an I.V. of 0.97.

The copolyester is extruded into 10-mil film at 290° C. and the film has an oxygen permeability of 2.9 cc-mil/100 in$^2$-24 hr-atm, a carbon dioxide permeability of 12.8 cc-mil/100 in$^2$-24 hr-atm, and a water vapor transmission rate of 1.6 g-mil/100 in$^2$-24 hr-atm.

15.

The copolyester of 60 mol % trans-4,4'-stilbenedicarboxylic acid, 40 mol % diglycolic acid and 100 mol % 1,3-propanediol is prepared according to the procedure of Example 2 to an I.V. of 0.80.

The copolyester is extruded into 5-mil film at 270° C., and the film has an oxygen permeability of 2.4 cc-mil/100 in$^2$-24 hr-atm.

The examples set forth in Table 2, prepared and analyzed according to the procedures described in Examples 12-14, show the exceptionally low oxygen permeability of the copolyesters of this invention.

TABLE 2

Oxygen Permeability of SDA/1,3-Propanediol Copolyesters

| Composition[a] | | I.V. | Oxygen Permeability, cc-mil/ 100 in²- 24 hr-atm |
|---|---|---|---|
| PET | Example 12 | 0.72 | 9.9 |
| 80(SDA)20(TPA)100(1,3-PD) | Example 13 | 0.98 | 2.2 |
| 70(SDA)30(TPA)100(1,3-PD) | Example 14 | 0.97 | 2.9 |
| 60(SDA)40(TPA)100(1,3-PD) | | 0.92 | 4.6 |
| 50(SDA)50(TPA)100(1,3-PD) | | 0.95 | 6.9 |
| 80(SDA)20(IPA)100(1,3-PD) | | 0.95 | 1.7 |
| 60(SDA)40(IPA)100(1,3-PD) | | 0.93 | 4.0 |
| 80(SDA)20(DGA)100(1,3-PD) | | 0.76 | 1.4 |
| 60(SDA)40(DGA)100(1,3-PD) | Example 15 | 0.80 | 2.4 |
| 80(SDA)20(G)100(1,3-PD) | | 0.82 | 2.2 |
| 60(SDA)40(G)100(1,3-PD) | | 0.97 | 9.0 |
| 100(SDA)75(1,3-PD)25(EG) | | 0.85 | 1.9 |
| 100(SDA)65(1,3-PD)35(EG) | | 0.74 | 2.3 |
| 90(SDA)10(TPA)67(1,3-PD)33(EG) | | 0.78 | 3.4 |
| 80(SDA)20(TPA)68(1,3-PD)32(EG) | | 0.73 | 5.2 |
| 100(SDA)70(1,3-PD)30(1,4-BD) | | 0.74 | 1.0 |
| 100(SDA)85(1,3-PD)15(cis-1,4-CHD) | | 0.89 | 1.1 |
| 100(SDA)75(1,3-PD)25(cis-1,4-CHD) | | 0.86 | 2.1 |
| 100(SDA)80(1,3-PD)20(75/25 trans/cis-1,3-CHD) | | 1.00 | 1.6 |
| 100(SDA)61(1,3-PD)39(75/25 trans/cis-1,3-CHD) | | 0.88 | 2.6 |

[a]The numbers preceding the compounds in () represent the mol % of the compound in the polymer; i.e., 80(SDA) means 80 mol % SDA.
SDA = trans-4,4'-stilbenedicarboxylic acid
TPA = terephthalic acid
IPA = isophthalic acid
DGA = diglycolic acid
G = glutaric acid
1,3-PD = 1,3-propanediol
EG = ethylene glycol
cis-1,4-CHD = cis-1,4-cyclohexanedimethanol
75/25 trans/cis-1,3-CHD = 75% trans/25% cis-1,3-cyclohexanedimethanol The invention has been described in detail with particular reference to preferred embodiments thereof, but it will be understood that variations and modifications can be effected within the spirit and scope of the invention.

We claim:

1. A film forming copolyester comprising repeating units prepared from 100 to 50 mol % trans-4,4'-stilbenedicarboxylic acid or esters thereof, repeating units prepared from 0 to 50 mol % of another aromatic dicarboxylic acid or esters thereof containing 8 to 20 carbon atoms or 0 to 40 mol % of an aliphatic dircarboxylic acid or esters thereof containing 3 to 10 carbon atoms, repeating units prepared from 10 to 60 mol % of 1.3-propanediol and repeating units prepared from 0 to 40 mol % of another aliphatic glycol containing 2 to 10 carbon atoms, provided that said copolyester contains at least 10 mol % of repeating units from said aromatic dicarboxylic acid or esters thereof, said aliphatic dicarboxylic acid or esters thereof, or said aliphatic glycol.

2. A copolyester of claim 1 wherein the repeating units from trans-4,4'-stilbenedicarboxylic acid portion of the copolyester are present in the amount of 100 to 60 mol %.

3. A copolyester of claim 1 wherein the repeating units from 1,3-propanediol portion of the copolyester are present in the amount of 100 to 70 mol %.

4. A copolyester of claim 1 wherein the repeating units from said trans-4,4'-stilbenedicarboxylic acid portion of the copolyester are present in the amount of 90 to 50 mol %.

5. A copolyester of claim 4 wherein the repeating units from said aromatic dicarboxylic acid or esters thereof are present in the amount of at least 10 mol % and said acid or esters thereof are selected from terephthalic acid, isophthalic acid, 2-chloroterephthalic acid or 2,5-diclorotherephthalic acid or their esters.

6. A copolyester of claim 1 wherein the repeating units from said aliphatic glycol are present in the amount of at least 10 mol % and said glycol is ethylene glycol.

* * * * *